(12) United States Patent
Ward et al.

(10) Patent No.: US 8,672,345 B2
(45) Date of Patent: Mar. 18, 2014

(54) CURTAIN AIRBAG FOR A MOTOR VEHICLE

(71) Applicant: Ford Global Technologies, LLC, Dearborn, MI (US)

(72) Inventors: Marcus John Scott Ward, Billericay (GB); Barry Grindle, Saffron Walden (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/900,830

(22) Filed: May 23, 2013

(65) Prior Publication Data

US 2013/0249199 A1     Sep. 26, 2013

Related U.S. Application Data

(62) Division of application No. 13/192,962, filed on Jul. 28, 2011, now Pat. No. 8,459,691.

(30) Foreign Application Priority Data

Jul. 29, 2010    (GB) .................................. 1012753.8

(51) Int. Cl.
  *B60R 21/232*     (2011.01)
  *B60R 21/2334*   (2011.01)

(52) U.S. Cl.
  USPC ................... 280/730.2; 280/743.1; 280/730.1

(58) Field of Classification Search
  USPC ................................. 280/730.2, 743.1, 730.1
  See application file for complete search history.

(56) References Cited

U.S. PATENT DOCUMENTS

| | | | |
|---|---|---|---|
| 5,324,072 | A | 6/1994 | Olson et al. |
| 5,924,723 | A | 7/1999 | Brantman et al. |
| 6,203,058 | B1 | 3/2001 | Elqadah et al. |
| 6,237,943 | B1 | 5/2001 | Brown et al. |
| 7,044,500 | B2 | 5/2006 | Kalandek et al. |
| 7,198,293 | B2 | 4/2007 | Olson |
| 7,597,349 | B2 | 10/2009 | Ochiai et al. |
| 8,186,710 | B2 | 5/2012 | Cheal et al. |
| 2003/0052476 | A1 | 3/2003 | Rose |
| 2003/0057683 | A1 | 3/2003 | Wipasuramonton et al. |
| 2004/0061320 | A1 | 4/2004 | Nakamura et al. |
| 2004/0100073 | A1 | 5/2004 | Bakhsh et al. |
| 2006/0066079 | A1 | 3/2006 | Inoue et al. |

(Continued)

FOREIGN PATENT DOCUMENTS

| | | |
|---|---|---|
| EP | 1384632 A1 | 1/2004 |
| EP | 1683688 A2 | 7/2006 |
| GB | 2393154 A | 3/2004 |

OTHER PUBLICATIONS

European Patent Office, Search Report for the corresponding EP Patent Application No. GB1012753.8 mailed Nov. 9, 2010.

(Continued)

*Primary Examiner* — Drew Brown
(74) *Attorney, Agent, or Firm* — Frank McKenzie; Brooks Kushman P.C.

(57) ABSTRACT

An inflatable curtain airbag is secured along an upper edge to a body structure of the motor vehicle and deploys downwardly when inflated. Prior to deployment, the lower edge of the curtain is not tethered to the vehicle body. When nearly or fully deployed, the lower edge of the curtain engages an adjacent part of the motor vehicle so as to form a virtual tether therebetween resisting relative movement between the curtain and the adjacent part.

9 Claims, 4 Drawing Sheets

(56) References Cited

U.S. PATENT DOCUMENTS

| | | |
|---|---|---|
| 2006/0097492 A1 | 5/2006 | Bakhsh et al. |
| 2006/0267315 A1 | 11/2006 | White, Jr. |
| 2006/0290122 A1 | 12/2006 | Woydick |
| 2008/0012275 A1 | 1/2008 | Pinsenschaum et al. |
| 2009/0243267 A1 | 10/2009 | Fletcher et al. |
| 2010/0078921 A1 | 4/2010 | Ryan et al. |

OTHER PUBLICATIONS

Intellectual Property Office, Search Report for the corresponding Great Britain Application No. GB1112553.1 mailed Nov. 14, 2011.

CURTAIN AIRBAG FOR A MOTOR VEHICLE

CROSS-REFERENCE TO RELATED APPLICATIONS

This application is a division of U.S. application Ser. No. 13/192,962 filed Jul. 28, 2011, which, in turn, claims foreign priority benefits under 35 U.S.C §119(a)-(d) to GB 1012753.8 filed Jul. 29, 2010, which is hereby incorporated by reference in its entirety.

TECHNICAL FIELD

This invention relates to motor vehicles and in particular to an improved curtain airbag for a motor vehicle.

BACKGROUND

It is well known to provide a motor vehicle with a curtain airbag to protect occupants from injury during an accident such as a collision or a roll-over event. A curtain airbag in its deployed or inflated condition covers some portion of the side wall and/or side window(s) of the vehicle.

It is known to use one or more tethers to retain or hold the curtain airbag in the desired position to achieve maximum safety benefit during an accident. Although the use of such tethers may reduce the risk of the airbag moving out of the proper functioning position, it may be difficult to use such tethers at a bottom edge of the curtain airbag. It is therefore desirable to provide a mechanism for improving the retention of a curtain airbag without the use of physical tethers between the airbag and the motor vehicle.

SUMMARY

It is an object of this invention to provide a curtain airbag for a motor vehicle having an improved resistance to movement away from the desired deployed position, thereby reducing the risk of injury to occupants during an accident.

According to a first aspect, a curtain airbag assembly for a motor vehicle comprises an inflatable curtain secured along its upper edge to a body structure of the motor vehicle. When deployed, a portion of the curtain engages an adjacent part of the motor vehicle so as to form a virtual tether therebetween and resist relative movement between the curtain and the adjacent part.

The curtain may engage with an adjacent part of the motor vehicle in at least one location near to a bottom edge of the curtain.

The curtain may engage with an adjacent part of the motor vehicle in at least one location near to at least one of a front edge and a rear edge of the curtain.

The curtain may engage with an adjacent part of the motor vehicle by having a bulbous portion engageable with an elongate recess formed in the adjacent part of the motor vehicle.

The elongate recess may have a lip formed along one edge to resist disengagement of the bulbous portion of the curtain from the recess.

The curtain may engage with an adjacent part of the motor vehicle by having a bulbous end defining a recess for engagement with a projecting lip formed as part of the adjacent body part.

The curtain may engage with an adjacent part of the motor vehicle by having a projecting lip for engagement with a recess formed as part of the adjacent body part.

The recess in the body part may be an elongate recess having a lip formed along one edge to resist disengagement of the projecting lip of the curtain from the elongate recess.

The curtain may engage with an adjacent part of the motor vehicle by having one or more apertures therein each for co-operation with a respective projecting finger formed as part of the adjacent body part.

The curtain may engage with an adjacent part of the motor vehicle by having an inflatable edge that inflates to grip the adjacent part of the motor vehicle.

The curtain may engage with an adjacent part of the motor vehicle by having an inflatable bulbous edge that engages with an elongate recess formed as part of the adjacent body part so as to retain the bulbous edge in the recess.

The curtain may engage with an adjacent part of the motor vehicle by having an inflatable edge portion defining an elongate recess that engages with a bulbous projection formed as part of the adjacent body part.

The elongate recess may be omega-shaped in transverse cross-section having an entrance portion that is narrower than a main chamber portion.

The curtain may engages with an adjacent part of the motor vehicle by having one half of a hook-and-loop fastener attached thereto for engagement with the other half of the hook-and-loop fastener attached to the adjacent part of the motor vehicle.

The adjacent part of the motor vehicle may be a trim member of the motor vehicle.

BRIEF DESCRIPTION OF THE DRAWINGS

The invention will now be described by way of example with reference to the accompanying drawing of which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
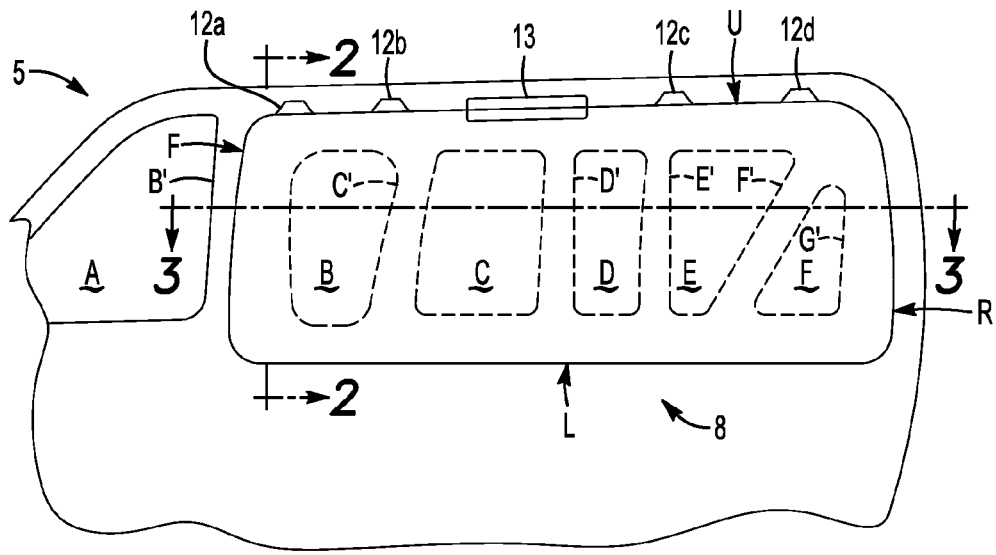
FIG. 1 is a partial side view of an interior of a motor vehicle showing a curtain airbag according to an embodiment of the invention in a deployed state.
Figure 2:
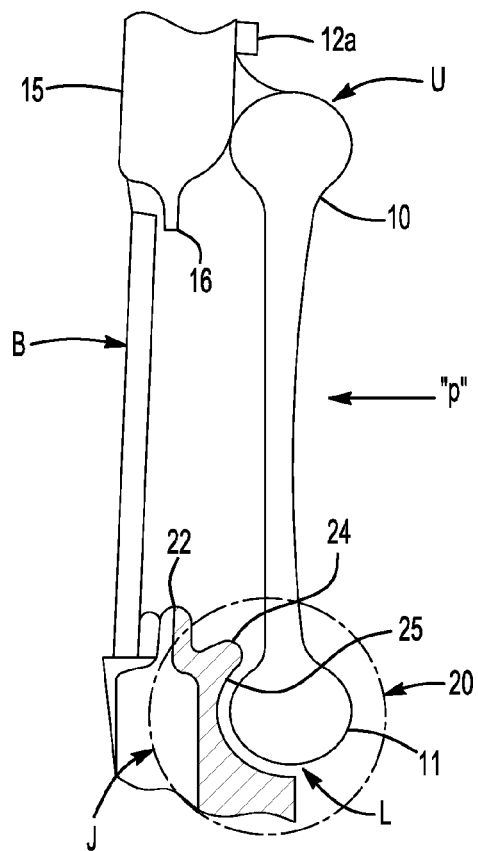
FIG. 2 is a cross-section along the line 2-2 in FIG. 1 showing a first embodiment of a virtual tether.

With particular reference to FIGS. 1 and 2 there is shown an interior view of a right hand side of a motor vehicle 5 having a number of structural pillars B', C', D', E', F' and G' forming part of window apertures 16 in which are located side windows A, B, C, D, E and F.

A curtain airbag assembly 8 is shown in a deployed state in which it overlies the windows B, C, D, E and F. The curtain airbag assembly 8 includes a curtain 10 fastened along an upper edge U at various fixing points 12a, 12b, 12c and 12d to part of a body structure of the motor vehicle 5 such as a cant rail 15 and an inflator 13 to provide a gas at pressure to inflate the curtain 10.

The curtain 10 has a front edge F, a rear edge R and a lower edge L and comprises one or more inflatable chambers used for reducing the force of impact if an occupant impacts against the curtain 10 when the curtain 10 is in the deployed state.

It will be appreciated that a corresponding curtain airbag assembly will be fitted to the left hand side of the motor vehicle 5.

As can best be seen with reference to FIG. 2, when the curtain 10 is deployed it is adapted for co-operation with an adjacent part of the motor vehicle 5 in the form of a trim member 22 so as to produce at a virtual tether 20 therebetween holding the curtain 10 in position.

The curtain is shown in FIG. 2 to be adapted adjacent to the lower edge L of the curtain 10 to form the virtual tether 20 between the respective part of the curtain 10 and the adjacent trim member 22 attached to and forming part of the motor vehicle 5.

It will be appreciated by those skilled in the art that an equivalent structure could be used adjacent to at least one of the front edge F and the rear edge R of the curtain 10 to form at least one virtual tether between the respective part of the curtain 10 and an adjacent part of the motor vehicle 5.

The virtual tether 20 comprises the shaping of the lower edge L of the curtain 10 so as to engage with a complementary shaped trim member 22 so as to form the virtual tether 20. In the shown embodiment the lower edge L of the curtain 10 is shaped by having a bulbous portion 11 engageable with an elongate recess 25 formed along at least a portion of the adjacent trim member 22 of the motor vehicle 5. The bulbous portion 11 is formed by an inflatable tube extending along at least a portion of the lower edge L of the curtain 10 that is inflated when the curtain 10 is deployed.

The elongate recess 25 has a lip 24 formed along an upper edge to resist disengagement of the bulbous portion 11 of the curtain from the elongate recess 25 when the curtain 10 is put into tension by, for example, the impact of a portion of an occupant's body against it from a passenger compartment side of the motor vehicle as indicated by the arrow "P" on FIG. 2. It will be appreciated that the bulbous portion 11 will be pulled against the end of the lip 24 when a force is applied to the deployed curtain 10 in the direction of the arrow "P" on FIG. 2 causing the end of the lip 24 to dig in to the curtain 10 thereby resisting the tensile forces generated in the curtain 10 between its upper edge U and its lower edge L and, thereby, keeping the lower edge L of curtain 10 in position and the curtain 10 relatively taut.

That is to say, the use of the virtual tether 20 prevents the lower edge L of the curtain 10 from moving upwardly to relieve the tension in the curtain 10 and as a consequence reduces the deformation of the curtain 10 outwardly towards or through the adjacent window aperture 16.

The curtain 10 is normally stowed in a compartment (not shown) extending along its upper edge U and is deployed out of the compartment in a downward direction when it is inflated by the inflator 13. When the lower edge L of the curtain 10 reaches the fully deployed position (as shown in FIGS. 1 and 2) it is positioned adjacent the elongate recess 25 with which it co-operates to form the virtual tether 20 along the lower edge L of the curtain 10.

Therefore there is no need to provide one or more conventional tethers to hold the lower edge L of the curtain 10 in place because the virtual tether 20 is automatically operable to hold the lower edge L of the curtain whenever it is deployed.

The term 'virtual tether' as used herein refers to any arrangement producing a physical engagement between a curtain and the adjacent part of the motor vehicle to retain or hold a curtain in place so as to resist relative movement, but in which the physical engagement does not come into existence until the curtain has reached a nearly- or fully-deployed condition. The virtual tether is unlike a conventional tether that has one end attached to the curtain and an opposite end attached to a structural part of the motor vehicle at all times, from pre-deployment through the deployed condition.

Figure 3:
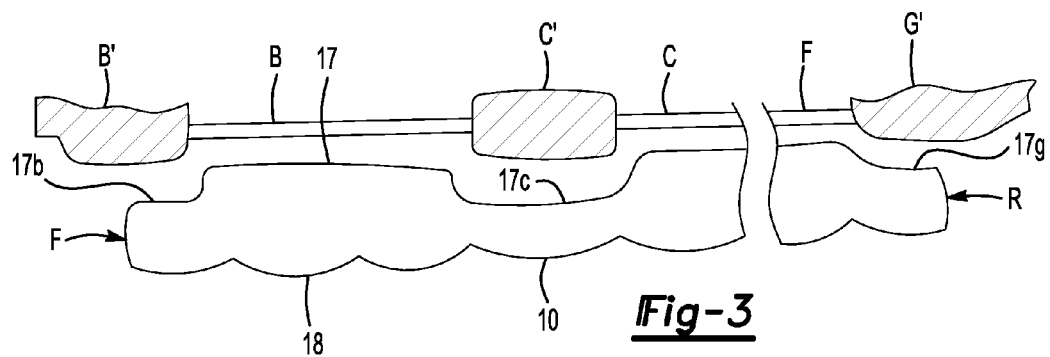
FIG. 3 is a broken cross-section along the line 3-3 in FIG. 1 showing front and rear portions of the curtain airbag shown in FIGS. 1 and 2.

Referring now to FIG. 3 the curtain 10 is shown to have an outer surface 17 facing one or more windows B, C, F and an inner surface 18 facing a passenger compartment of the motor vehicle 5.

The outer surface 17 may have shaped portions 17b, 17c and 17g where it overlies the pillars B', C' and G' so as to conform approximately to the shape of the respective pillar B', C' and G'.

The shaping of the curtain 10 allows it to co-operate better with the body structure of the motor vehicle 5 and in particular the shaped portion 17c engages with the respective pillar C so as to form a virtual tether therebetween resisting side-to-side movement of the curtain 10. That is to say, if an occupant or other object impacts only against the inner surface 18 of the part of the curtain 10 overlying the window B, the shaped portion 17c prevents the curtain 10 from being dragged forwardly over the pillar C thereby reducing the risk that it will be at least partially forced through the aperture in which the window B is fitted.

It will be appreciated that the front and rear edges F and R of the curtain 10 also are shaped by the provision of the shaped portions 17b, 17g to co-operate with the adjacent pillars B', G' and provide a good interaction between the curtain 10 and the structure of the motor vehicle 5 so that the friction between the inner surface 17 of the curtain 10 and the body structure in the region of the shaped portions 17b, 17g may constitute a virtual tether therebetween.

Alternatively, some other virtual tether arrangement could be used such as, for example, a hook-and-loop connection such as a Velcro® fastener.

It will be appreciated that the edge virtual tethering shown in FIG. 3 could be combined with the lower edge virtual tethering shown in FIGS. 1 and 2 to secure the curtain around its free periphery.

Figure 4:
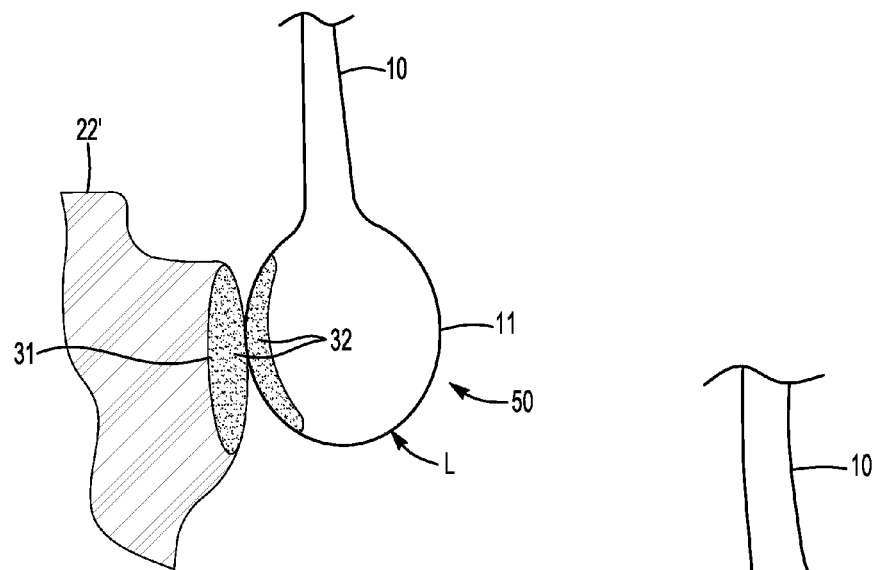
FIG. 4 is a cross-section through a second embodiment of a virtual tether according to the invention.

With reference to FIG. 4 there is shown a second embodiment of virtual tether 50. FIG. 4 corresponds approximately to the area shown by a chain dotted circle T on FIG. 2 and shows the virtual tether 50 on an enlarged scale.

The virtual tether 50 comprises at the lower edge L of the curtain 10 a bulbous portion 11 having one half 32 of a hook-and-loop fastener attached thereto for co-operation with the other half 31 of the hook-and-loop fastener attached to the adjacent trim member 22' forming part of the motor vehicle 5. The hook-and-loop fastener may be of any known type such as for example a Velcro® fastener and it is believed to be generally preferable if the loop part 31 is attached to the trim member 22'.

When the curtain 10 is deployed it rests naturally against the trim member 22' and any load applied by part of an occupant impacting against the curtain 10 will cause the hook-and-loop fastener portions 32 and 31 to fully engage to form a virtual tether between the curtain 10 and the trim member 22' thereby holding the curtain 10 in place at least along its lower edge L.

Figure 5:
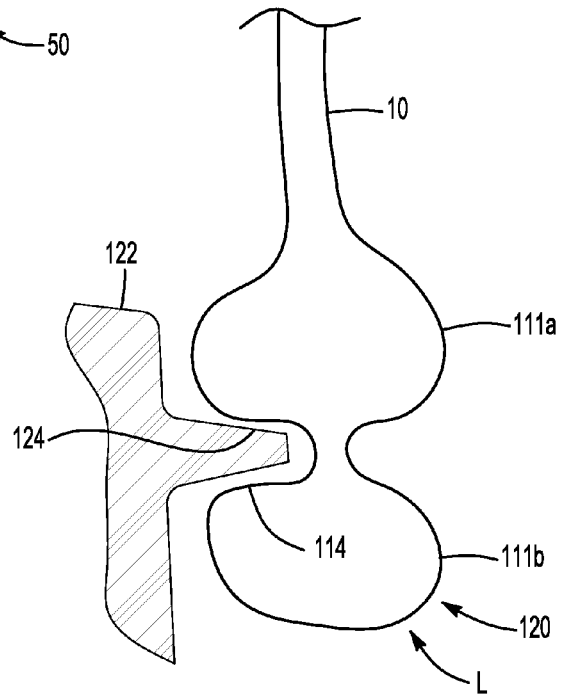
FIG. 5 is a cross-section through a third embodiment of a virtual tether according to the invention.

With reference to FIG. 5 there is shown a third embodiment of a virtual tether 120. FIG. 5 corresponds approximately to the area shown by the chain dotted circle T on FIG. 2 and shows the virtual tether 120 on an enlarged scale.

The lower edge L of the curtain 10 has a double bulbous portion 111a, 111b defining therebetween an elongate recess 114 extending along at least a portion of the lower edge L of the curtain 10.

A trim member 122 forming part of the motor vehicle 5 has a projecting lip 124 formed as an integral part thereof for engagement with the elongate recess 114 defined by the shaping of the lower edge L of the curtain 10 as two bulbous portions 111a and 111b.

The projecting lip 124 forms in combination with the elongate recess 114 the virtual tether 120 between the curtain 10 and the motor vehicle 5 along the lower edge L of the curtain 10 when the curtain 10 is deployed and the projecting lip 124 engages with the elongate recess 114.

The two bulbous portions 111a and 111b are inflatable portions of the curtain 10 and preferably grip the projecting lip 124 when fully inflated.

Figure 6:
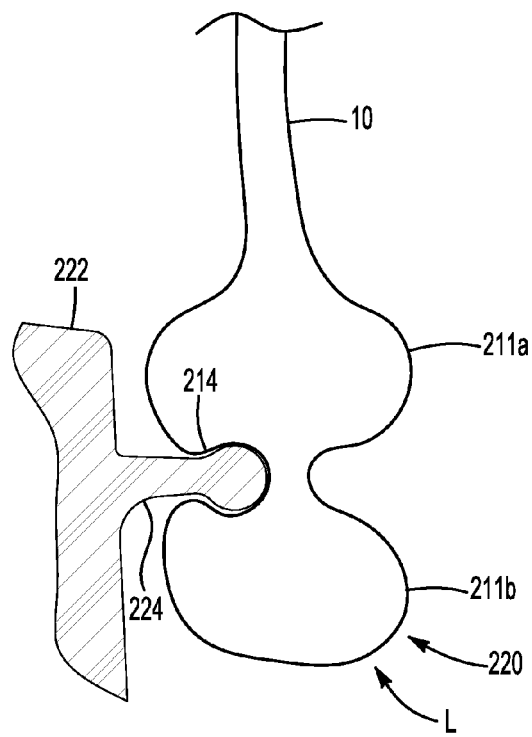
FIG. 6 is a cross-section through a fourth embodiment of a virtual tether according to the invention.

With reference to FIG. 6 there is shown a fourth embodiment of virtual tether 220. FIG. 6 corresponds approximately to the area shown by the chain dotted circle T on FIG. 2 and shows the virtual tether 220 on an enlarged scale.

The lower edge L of the curtain 10 has a double bulbous portion 211a, 211b defining therebetween an elongate recess 214 extending along at least a portion of the lower edge L of the curtain 10. The two bulbous portions 211a and 211b are inflatable portions of the curtain 10.

A trim member 222 attached to a structural part of the motor vehicle 5 has a projecting lip 224 formed as an integral part thereof for engagement with the elongate recess 214 defined by the shaping of the lower edge L as two bulbous portions 211a and 211b. The projecting lip 224 has in this case a bulbous or enlarged tip to help to hold the projecting lip 224 in engagement with the elongate recess 214.

The projecting lip 224 forms in combination with the elongate recess 214 the virtual tether 220 between the curtain 10 and the structure of the motor vehicle 5 along the lower edge L of the curtain 10 when the curtain 10 is deployed and the projecting lip 224 is engaged with the elongate recess 214.

When the curtain 10 is first deployed the area of the curtain 10 that forms the recess lies adjacent the projecting lip 224 but the two bulbous portions 211a and 211b may not be fully inflated. When the two bulbous portions 211a and 211b fill with gas they expand fully to define the elongate recess 214 and grip the projecting lip 224 thereby holding the curtain 10 to the trim member 222 which itself is fastened to an underlying part of the body structure of the motor vehicle 5.

Figure 7:
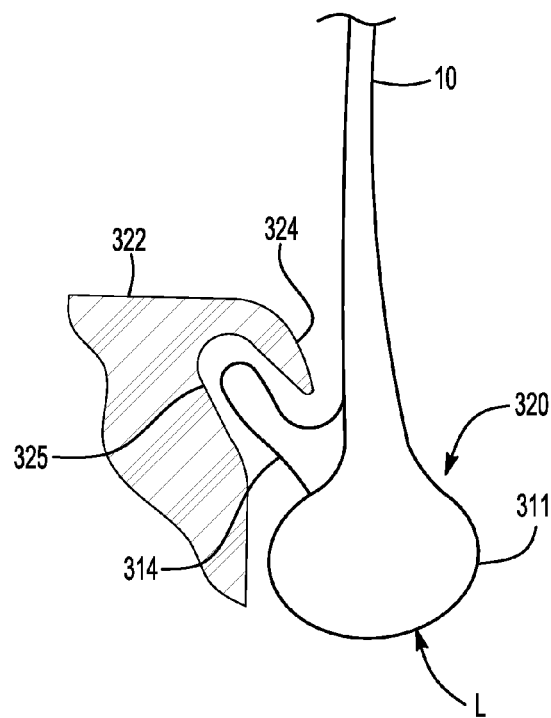
FIG. 7 is a cross-section through a fifth embodiment of a virtual tether according to the invention.

With reference to FIG. 7 there is shown a fifth embodiment of virtual tether 320. FIG. 7 corresponds approximately to the area shown by the chain dotted circle T on FIG. 2 and shows the virtual tether 320 on an enlarged scale.

The lower edge L of the curtain 10 has an inflatable bulbous portion 311 having a projecting lip 314 formed as an integral part thereof for engagement with an elongate recess 325 formed in a trim member 322 of the motor vehicle 5 so as to form a virtual tether 320.

The elongate recess 325 has a lip 324 formed along one edge to resist disengagement of the projecting lip 314 of the curtain 10 from the elongate recess 325.

When the curtain 10 is first deployed the projecting lip 314 lies adjacent to the elongate recess 325 and is then pushed into engagement by the inflating bulbous portion 311 and is pulled fully into engagement with the elongate recess if the curtain 10 is impacted against by a body part of an occupant thereby stabilizing and holding the lower edge L of the curtain 10 in position.

Figure 8:
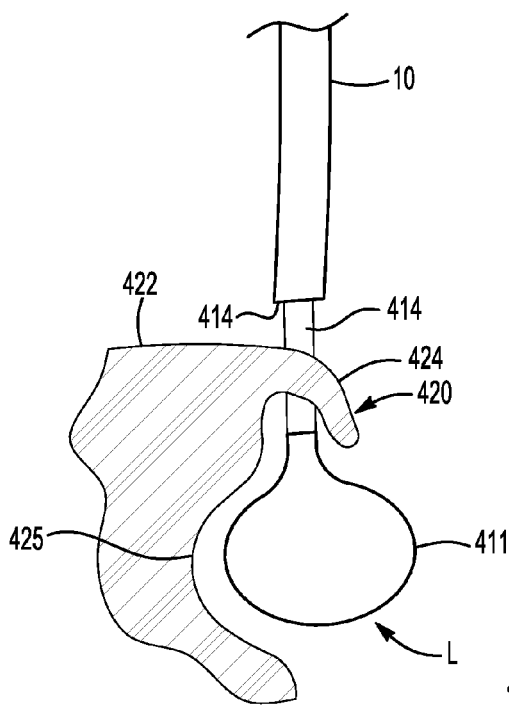
FIG. 8 is a cross-section through a sixth embodiment of a virtual tether according to the invention.
Figure 9:
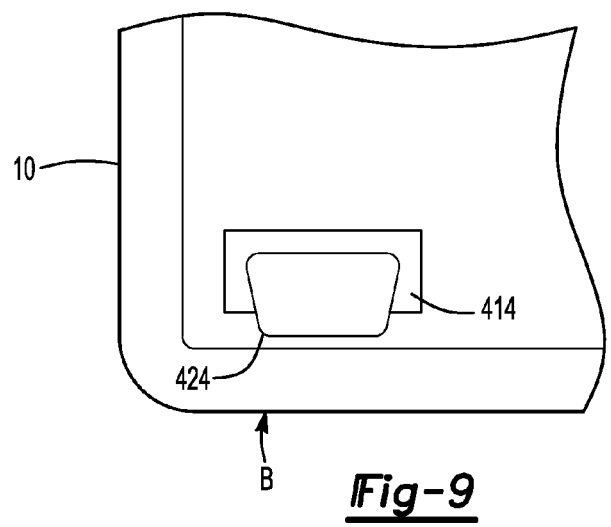
FIG. 9 is a front view of the virtual tether shown in FIG. 8.

With reference to FIGS. 8 and 9 there is shown a sixth embodiment of virtual tether 420. FIG. 8 corresponds approximately to the area shown by the chain dotted circle 'J' on FIG. 2 and shows the virtual tether 420 on an enlarged scale.

The virtual tether 420 comprises an inflatable bulbous portion 411 at the lower edge L of the curtain 10 and an aperture 414 through which a projecting lip 424 formed as part of a trim member 422 extends so as to allow the bulbous portion to engage with a recess 425 in the trim member 422.

It will be appreciated that there may be a number of apertures 414 and projecting lips 424 spaced out along the length of the curtain 10.

When the curtain 10 is first deployed each projecting lip 424 lies adjacent to a respective aperture 414 and is pulled fully into engagement with the respective aperture 414 if the curtain 10 is impacted against by a body part of an occupant thereby stabilizing and holding the lower edge L of the curtain 10 in position.

Figure 10:
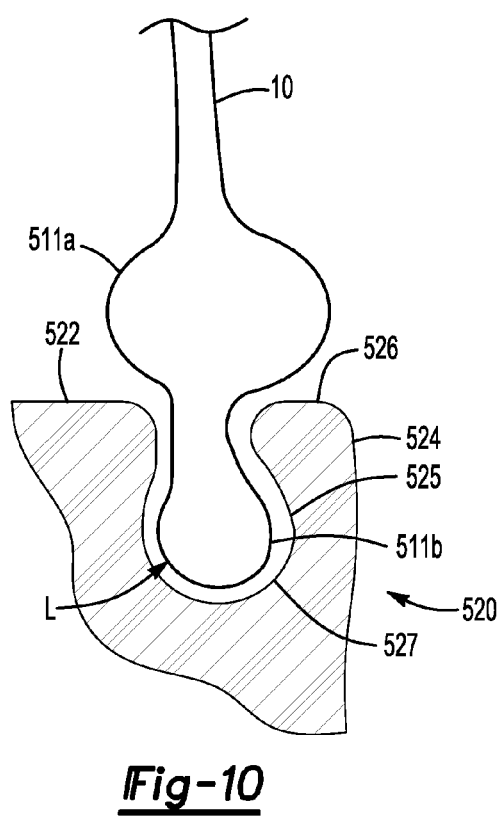
FIG. 10 is a cross-section through a seventh embodiment of a virtual tether according to the invention.

With reference to FIG. 10 there is shown a seventh embodiment of virtual tether 520. FIG. 10 corresponds approximately to the area shown by the chain dotted circle T on FIG. 2 and shows the virtual tether 520 on an enlarged scale.

The virtual tether 520 comprises a double bulbous portion 511a, 511b extending along at least a portion of the lower edge L of the curtain 10 for cooperation with an upwardly facing elongate recess 525 formed in a trim member 522 attached to part of a body structure of the motor vehicle 5.

The two bulbous portions 511a and 511b of the curtain 10 are inflatable portions of the curtain 10 which are inflated when the curtain 10 is deployed.

The trim member 522 attached to part of the motor vehicle 5 has the upwardly facing recess 525 defined on one edge by a lip 524 formed as an integral part of the trim member 522.

The elongate recess 525 extends along the trim member 522 and may be approximately omega-shaped (Ω) in transverse cross-section having an entrance portion 526 that is narrower than a main chamber portion 527.

When the curtain 10 is first deployed the lower edge L of the curtain may be less than fully inflated such that it falls naturally into engagement with the elongate recess 525. When the two bulbous portions 511a and 511b subsequently fill with gas they expand thereby trapping the bulbous portion 511b of the curtain 10 in the omega-shaped elongate recess 525 where it is gripped by the lip 524 thereby holding the curtain 10 in position. It will be appreciated that the two bulbous portions 511a, 511b could be a single inflatable portion of the curtain 10 and merely adopt the shape of two bulbous portions due to the restraining effect of the trim member 522.

Figure 11:
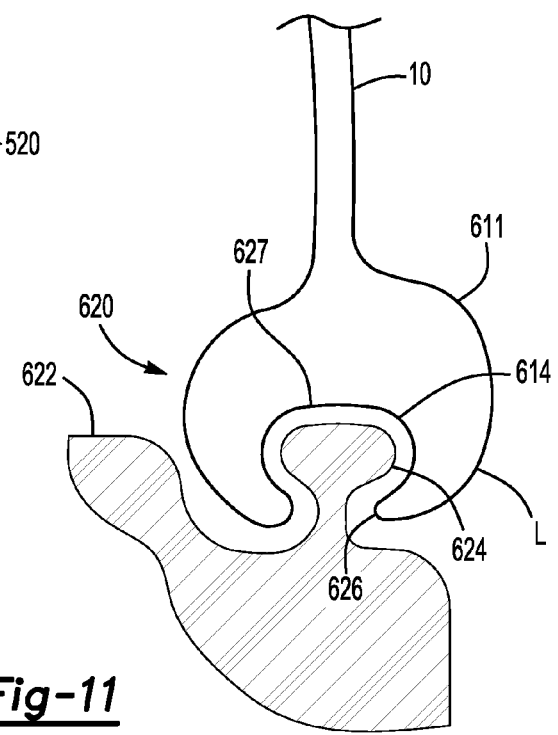
FIG. 11 is a cross-section through an eighth embodiment of a virtual tether according to the invention.

With reference to FIG. 11 there is shown an eighth embodiment of virtual tether 620. FIG. 11 corresponds approximately to the area shown by the chain dotted circle T on FIG. 2 and shows the virtual tether 620 on an enlarged scale.

The virtual tether 620 comprises a bulbous portion 611 extending along the lower edge L of the curtain 10 defining an elongate recess 614 for cooperation with an upwardly facing bulbous lip 624 formed on a trim member 622 attached to part of the body structure of the motor vehicle 5.

The bulbous portion 611 of the curtain 10 is an inflatable portion of the curtain 10 which is inflated when the curtain 10 is deployed. The elongate recess 614 extends along at least a portion of the lower edge L of the curtain 10 and may be omega (Ω) shaped in transverse cross-section having an entrance portion 626 that is narrower than a main chamber portion 627.

The trim member 622 is attached to and forms part of the motor vehicle 5 and has the upwardly projecting bulbous lip 624 formed as an integral part.

When the curtain 10 is first deployed the lower edge L of the curtain may not be fully inflated so that it falls naturally onto the bulbous lip 624. When the bulbous portion 611 of the curtain 10 is subsequently filled with gas it expands to form the elongate omega-shaped recess 614 thereby trapping the bulbous lip 624 in the elongate recess 614 so as to hold the curtain 10 in position.

Therefore in summary, the embodiments of the invention provide an improved form of curtain airbag by providing one or more virtual tethers between an edge of the airbag and the motor vehicle that self-engage to hold the respective edge in position thereby resisting extrusion of the airbag. In some embodiments the edge portion may be arranged to inflate so as to grip the part of the motor vehicle with which they engage or co-operate.

It will be appreciated by those skilled in the art that although the invention has been described by way of example with reference to one or more embodiments it is not limited to the disclosed embodiments and that one or more modifications to the disclosed embodiments or alternative embodiments could be constructed without departing from the scope of the invention as set out in the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A curtain airbag assembly for a motor vehicle comprising:
an inflatable curtain secured along an upper edge to a body structure of the motor vehicle, the curtain when deployed having a bulbous portion defining a recess therein engageable with a projecting lip formed in an adjacent part of the motor vehicle to resist relative movement between the curtain and the adjacent part.

2. The curtain airbag assembly of claim 1 wherein the bulbous portion is adjacent to a bottom edge of the curtain.

3. The curtain airbag assembly of claim 1 wherein the bulbous portion is adjacent to at least one of a front edge and a rear edge of the curtain.

4. The curtain airbag assembly of claim 1 wherein the bulbous portion of the curtain is inflatable.

5. The curtain airbag assembly of claim 1 wherein the recess is omega-shaped in transverse cross-section.

6. The curtain airbag assembly of claim 1 wherein the adjacent part of the motor vehicle is a trim member of the motor vehicle.

7. Apparatus for a motor vehicle comprising:
an inflatable curtain secured along an upper edge to a body structure of the motor vehicle for deployment in a downward direction adjacent to a side wall of the vehicle and having a an inflatable bulbous portion defining a recess therein disposed adjacent to a lower edge of the curtain; and
an interior part of the motor vehicle disposed adjacent to the lower edge of the curtain when the curtain is deployed and having a projecting lip that matingly engages with the recess to resist relative movement between the curtain and the interior part.

8. The apparatus of claim 7 wherein the bulbous portion comprises a second projecting lip which defines an edge of the recess.

9. A curtain airbag for a motor vehicle comprising:
an upper edge adapted for mounting to a body structure of the motor vehicle for downward deployment of the airbag; and
a lower edge comprising, when the airbag is inflated, an inflatable bulbous portion defining a recess therein, the recess engageable with part of the motor vehicle adjacent to the lower edge to resist movement of the lower edge upward relative to the adjacent part.

* * * * *